March 26, 1963     J. W. DUNCAN     3,082,562
FISHING BOB
Filed June 27, 1961
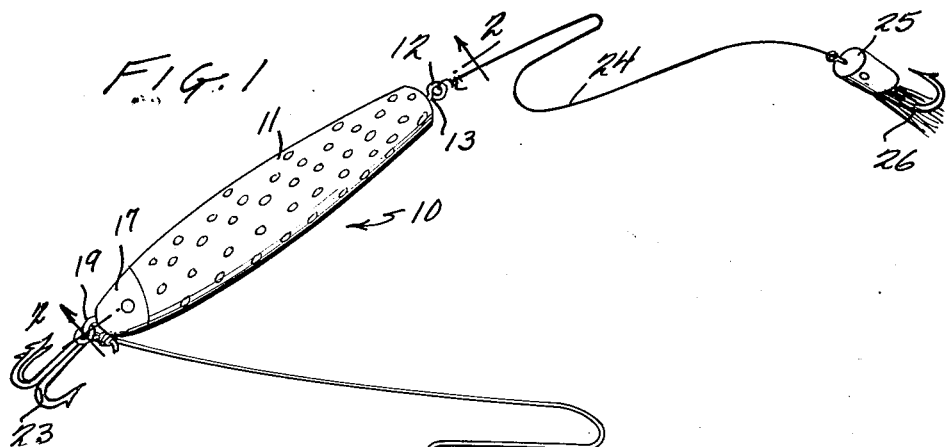
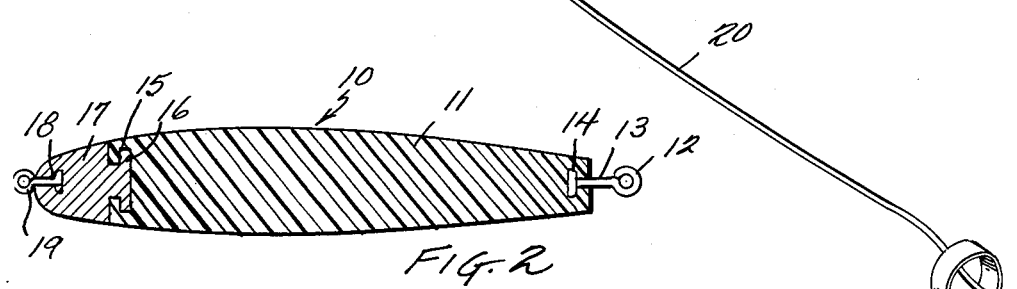
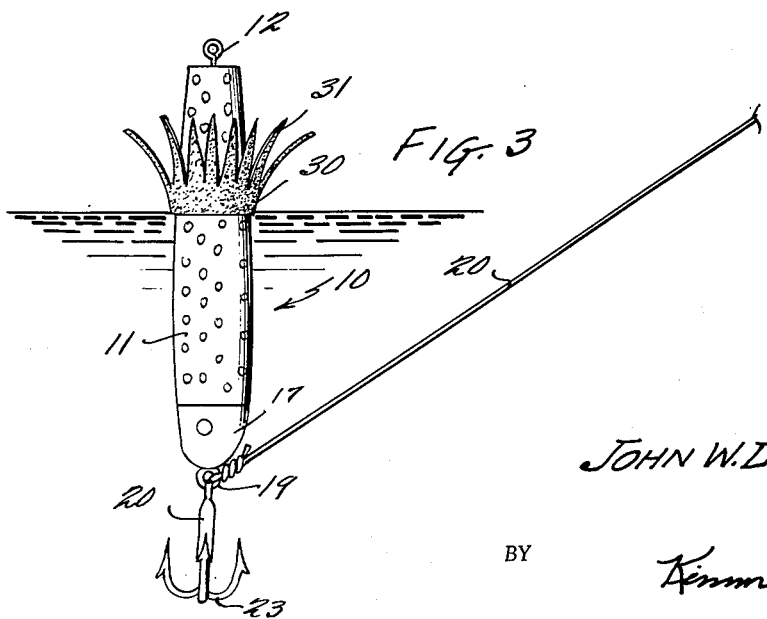
INVENTOR
JOHN W. DUNCAN
BY Kimmel & Crowell
ATTORNEYS

United States Patent Office 3,082,562
Patented Mar. 26, 1963

3,082,562
FISHING BOB
John W. Duncan, R.F.D. 2, Social Circle, Ga.
Filed June 27, 1961, Ser. No. 119,854
1 Claim. (Cl. 43—42.15)

The invention relates to a fishing bob, and has as its primary object the provision of an improved fishing bob which will float in upright position, and which will be exceptionally attractive to fish.

An additional object of the invention is a fishing bob of this character having a swivel on its upper or floating end to which may be attached a fly or other lure.

A further object of the invention is the provision of a device of this character which is provided with a skirt which further enhances its appearance.

Still other objects reside in the combinations of parts, arrangements of elements, and features of construction, all as will be more fully pointed out hereinafter and disclosed in the accompanying drawing wherein there is shown a preferred embodiment of this inventive concept.

In the drawings:

FIGURE 1 is a perspective view of one form of lure embodying the instant inventive concept, showing a fly and a line attached thereto.

FIGURE 2 is a sectional view on an enlarged scale taken substantially along the line 2—2 of FIG. 1; and FIGURE 3 is an elevational view of a modified form of construction shown in floating or upright position.

Similar reference characters refer to similar parts throughout the several views of the drawing.

Having reference now to the drawings in detail, the fishing bob of the instant invention is generally indicated at 10 and comprises a body 11 of cork, plastic, or similar floatable material. An eye 12 carried by a shaft 13 is swivelably mounted as at 14 in one end of the body 11. The other end of the body is undercut as at 15, to accommodate a flange portion 16 of a lead weight 17. The lead weight has swivelably mounted therein the shaft 18 of an eye 19, to which is attached the line 20 which extends from the tip 21 of the fishing pole 22. Eye 19 carries a gang hook 23 which, when the lure is in floating position, is suspended downwardly from the nose or bottom thereof.

A leader 24 may be attached to the swiveling eye 12 and carry at its outer end a fly or lure 25, the arrangement being such that the lure 25 with its associated hook 26 floats or drifts on the surface of the water when the device is in floating or upright position as indicated in FIG. 3.

In order to enhance the ornamental appearance of the device as well as to insure its floating at a proper level, the level being gauged by the weight 17, a skirt 30 is provided which encircles the body 11 substantially at the water line, and which is provided with a fringe 31 which projects upwardly, and which when agitated provides an additional attraction to a fish.

From the foregoing it will now be seen that there is herein provided an improved fishing lure, which accomplishes all the objects of this invention, and others, including many advantages of practical utility.

As many embodiments may be made of this inventive concept, and as many modifications may be made in the embodiment hereinbefore shown and described, it is to be understood that all matter herein is to be interpreted merely as illustrative, and not in a limiting sense.

I claim:

A fishing bob comprising an elongated substantially cylindrical body portion of buoyant material, a shaft having an eye thereon swivelably mounted in one end of said body, the other end of said body having portions defining an undercut therein, a weight having a flange portion thereon mounted on said body at the end having the undercut therein to cause said body to float in a vertical position, said flange on said weight being engaged in the undercut in said body, a shaft having an eye thereon swivelably mounted in said weight and having a hook secured in said last named eye, a floating fly attached to the eye of said shaft swivelably mounted in said body, a fringed rubber skirt mounted on said body in surrounding relation thereto at a water line thereof the greater part of said body being submerged, said water line being between the ends of said body, with the planar edge of said skirt being at said water line, and a line extending from a fishing pole attached to the eye of said shaft swivelably mounted in said weight.

References Cited in the file of this patent

UNITED STATES PATENTS

| 1,230,968 | Wilber et al. | June 26, 1917 |
|---|---|---|
| 2,262,974 | Steiner | Nov. 18, 1941 |
| 2,268,541 | Arbogast | Jan. 6, 1942 |
| 2,587,189 | McFarland | Feb. 26, 1952 |
| 2,607,152 | Kubiak et al. | Aug. 19, 1952 |
| 2,611,986 | Silva | Sept. 30, 1952 |
| 2,739,408 | Eatinger | Mar. 27, 1956 |
| 2,794,288 | Marshall et al. | June 4, 1957 |
| 2,817,923 | Wertz | Dec. 31, 1957 |
| 2,910,798 | Bias | Nov. 3, 1959 |

FOREIGN PATENTS

| 138,416 | Germany | July 25, 1934 |